(12) United States Patent
Kim et al.

(10) Patent No.: US 8,492,076 B2
(45) Date of Patent: Jul. 23, 2013

(54) METHOD OF MANUFACTURING CARBON NANOTUBE DEVICE ARRAY

(75) Inventors: Un-jeong Kim, Busan (KR); Eun-hong Lee, Anyang-si (KR); Young-hee Lee, Suwon-si (KR); Il-ha Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 598 days.

(21) Appl. No.: 12/591,771

(22) Filed: Dec. 1, 2009

(65) Prior Publication Data

US 2010/0291486 A1    Nov. 18, 2010

(30) Foreign Application Priority Data

May 14, 2009    (KR) .................. 10-2009-0042192

(51) Int. Cl.
*D01F 9/12*    (2006.01)
(52) U.S. Cl.
USPC ............ 430/313; 977/842; 977/742; 977/750
(58) Field of Classification Search
USPC .......................... 977/842, 742, 750; 430/313
See application file for complete search history.

(56) References Cited

U.S. PATENT DOCUMENTS

| | | |
|---|---|---|
| 6,956,698 B2 | 10/2005 | Li et al. |
| 7,052,588 B2 | 5/2006 | Gu et al. |
| 2004/0136896 A1 | 7/2004 | Liu et al. |
| 2004/0241896 A1* | 12/2004 | Zhou et al. ............... 438/48 |
| 2005/0089467 A1 | 4/2005 | Grill et al. |
| 2006/0273356 A1 | 12/2006 | Matsumoto et al. |
| 2009/0278556 A1* | 11/2009 | Man et al. ............... 324/693 |

FOREIGN PATENT DOCUMENTS

| | | |
|---|---|---|
| JP | 2006-148063 | 6/2006 |
| KR | 10-2002-0038034 | 5/2002 |
| KR | 10-0372335 | 2/2003 |
| KR | 10-0434271 | 6/2004 |
| KR | 10-0593835 | 6/2006 |

OTHER PUBLICATIONS

Search Report dated Sep. 3, 2010 for corresponding European Patent Application No. EP 10 15 5826.
Charlie Feigenoff: "Making Nanodevices on a Desktop" [online] Dec. 1, 2007, XP002590457 OSCAR, the whole document.
Jaber Derakhshandeh, et al., "Nano-scale MOSFET Devices Fabricated Using a Novel Carbon-Nanotube-Based Lithography", Mater. Res.Soc.Symp.Proc., vol. 913, 0913-D04, 2006, XP002590462, the whole document.
Jean-Christophe P. Gabriel, "Large Scale Production of Carbon Nanotube Transistors: A Generic Platform for Chemical Sensors" Mat. Res. Soc. Symp. Proc., vol. 776, 2003, XP002590458 nanomix, Inc., the whole document.
H. Wang, et al., "Controlled synthesis of aligned carbon nanotube arrays on catalyst patterned silicon substrates by plasma-enhanced chemical vapor deposition", Applied Surface Science, vol. 181, No. 3-4, Sep. 21, 2001, XP002590460 DOI:, pp. 248-254.
Limin Huang, et al., "Cobalt Ultrathin Film Catalyzed Ethanol Chemical Vapor Deposition of Single-Walled Carbon Nanotubes", J. Phys. Chem. B, vol. 110, No. 23, May 16, 2006, pp. 11103-11109.
K. Tsukagoshi, et al., "Carbon nanotube devices for nanoelectronics" Physica B: Condensed Matter, vol. 323, No. 1-4, Oct. 1, 2002, pp. 107-114.

* cited by examiner

*Primary Examiner* — Daborah Chacko Davis
(74) *Attorney, Agent, or Firm* — Harness, Dickey & Pierce

(57) ABSTRACT

Provided is a method of manufacturing carbon nanotube (CNT) device arrays. In the method of manufacturing CNT device arrays, catalyst patterns may be formed using a photolithography process, CNTs may be grown from the catalyst patterns, and electrodes may be formed on the grown CNTs.

16 Claims, 8 Drawing Sheets

METHOD OF MANUFACTURING CARBON NANOTUBE DEVICE ARRAY

CROSS-REFERENCE TO RELATED APPLICATION

This application claims priority under 35 USC §119 to Korean Patent Application No. 10-2009-0042192, filed on May 14, 2009, in the Korean Intellectual Property Office (KIPO), the entire contents of which are incorporated herein by reference.

BACKGROUND

1. Field

Example embodiments relate to a method of manufacturing carbon nanotube (CNT) device arrays.

2. Description of the Related Art

Carbon nanotube (CNT) devices including CNTs may be formed in an array form and may be used to form various highly efficient electronic devices. For example, CNT device arrays may be used as efficient electronic devices in various areas, for example, logic circuits including complementary metal-oxide semiconductor (CMOS)-type inverters, memory devices including ring oscillators, static random access memories (SRAMs), non-volatile random access memories (NVRAMs), and other various sensors.

CNT device arrays may be manufactured using e-beam lithography. In a method of manufacturing CNT device arrays using e-beam lithography, the CNTs are grown on a silicon substrate and observed using atomic force microscopy (AFM). Electrodes may be formed on the CNTs by patterning using the e-beam lithography, and thus, the CNT device arrays are manufactured. However, the method of manufacturing CNT device arrays using e-beam lithography may be inefficient in terms of cost and/or time, and thus, mass production of the CNT device arrays may be difficult.

SUMMARY

Example embodiments include a method of manufacturing carbon nanotube (CNT) device arrays. Additional aspects will be set forth in part in the description which follows and, in part, will be apparent from the description, or may be learned by practice of example embodiments.

According to example embodiments, a method of manufacturing carbon nanotube (CNT) device arrays includes forming an oxide layer on a substrate; forming catalyst patterns on the oxide layer using a photolithography process; growing at least one CNT corresponding to each of the catalyst patterns on the oxide layer; forming at least one electrode on the at least one CNT corresponding to each of the catalyst patterns to form a plurality of CNT devices; and removing portions of the at least one CNT corresponding to each of the catalyst patterns that remains on the oxide layer and are not included in the plurality of CNT devices.

In example embodiments, the substrate may include silicon and the oxide layer may include a silicon oxide. Forming the oxide layer may include forming at least one alignment marker thereon. Forming the catalyst patterns may include forming a catalyst metal layer on the oxide layer; forming a photoresist on the catalyst metal layer; exposing and developing the photoresist; etching the catalyst metal layer using the developed photoresist; and removing the photoresist.

In example embodiments, forming the catalyst patterns may include coating a photoresist on the oxide layer; exposing and developing the photoresist in order to form via holes that expose the oxide layer and have the same shape as the catalyst patterns; immersing a portion of the oxide layer where the developed photoresist is formed in a solution and removing the oxide layer from the solution, the solution dissolving a catalyst metal; and removing the photoresist.

In example embodiments, forming the catalyst patterns may include coating a solution mixture of a catalyst metal and a photoresist on the oxide layer in order to form a catalyst resist layer on the oxide layer; exposing and developing the catalyst resist layer; and removing the photoresist. Growing the at least one CNT may include using chemical vapor deposition (CVD). The at least one CNT corresponding to each of the catalyst patterns may include at least one single-wall CNT.

In example embodiments, the at least one CNT corresponding to each of the catalyst patterns may be in a direction parallel to the surface of the oxide layer. Forming the at least one electrode may include forming a first electrode and a second electrode, spaced apart from each other, the at least one CNT corresponding to each of the catalyst patterns connecting the first electrode to the second electrode. The first electrode, the second electrode, and the at least one CNT connecting the first electrode to the second electrode may be a source electrode, a drain electrode, and a channel material layer, respectively, and the plurality of CNT devices may constitute a plurality of CNT transistors.

In example embodiments, forming the at least one electrode may include using a photolithography process. Forming the at least one electrode may include forming a photoresist on the oxide layer to cover the at least one CNT corresponding to each of the catalyst patterns; exposing and developing the photoresist in order to form via holes that expose the oxide layer and the at least one CNT and have the same shape as the at least one electrode; forming a metal layer on the developed photoresist so as to fill the via holes; and removing the photoresist.

In example embodiments, removing the portions of the at least one CNT corresponding to each of the catalyst patterns may include forming a photoresist on the oxide layer to cover the plurality of CNT devices; exposing and developing the photoresist; using the developed photoresist as a protection film and removing the portions of the at least one CNT remaining around the plurality of CNT devices; and removing the photoresist. Removing the photoresist may include using a photoresist stripper, e.g., acetone. Removing the portions of the at least one CNT remaining around the plurality of CNT devices includes using plasma etching or ion milling.

According to example embodiments, a photolithography process may be used in the method of manufacturing the CNT device arrays so that CNTs may be formed on desired positions and the electrodes may be accurately formed on desired positions of the CNTs. Accordingly, CNT device arrays having a relatively large area may be more easily and economically manufactured. In addition, a plurality of electrodes may be formed on a single CNT so that a plurality of CNT devices having the same characteristics may be manufactured.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
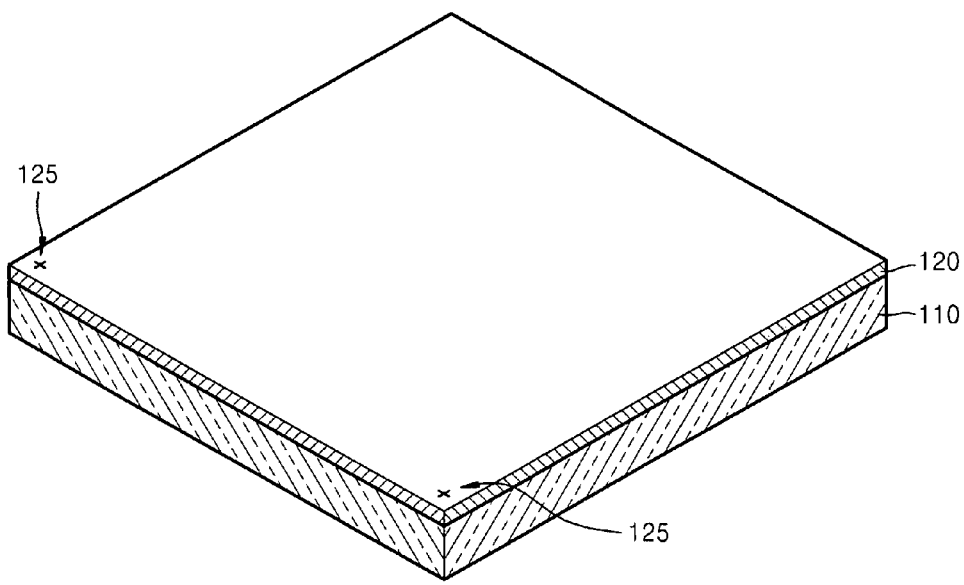
FIGS. 1 through 10 are cross-sectional views illustrating a method of manufacturing carbon nanotube (CNT) device arrays, according to example embodiments.

Hereinafter, example embodiments will be described more fully with reference to the accompanying drawings. However, specific structural and functional details disclosed herein are merely representative for purposes of describing example embodiments. In this regard, example embodiments may be embodied in many alternate forms and should not be construed as limited to only example embodiments set forth herein. In the drawings, like reference numerals denote like elements and the thicknesses of layers and regions are exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element or layer is referred to as being "formed on," another element or layer, it may be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. In the drawings, the thicknesses of layers and regions are exaggerated for clarity. Like reference numerals in the drawings denote like elements.

Reference will now be made in detail to example embodiments, which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description.

FIGS. 1 through 10 are cross-sectional views illustrating a method of manufacturing carbon nanotube (CNT) device arrays, according to example embodiments. Referring to FIG. 1, a substrate 110 is prepared. The substrate 110 may be, for example, silicon; however, example embodiments are not limited thereto. An oxide layer 120 may be formed on the substrate 110. The oxide layer 120 may be formed of, for example, a silicon oxide. In order to form catalyst patterns 130 illustrated in FIG. 2 and first and second electrodes 151 and 152 illustrated in FIG. 7 on desired positions of the oxide layer 120, alignment markers 125 may be formed on the oxide layer 120 in order to align a photo mask (not illustrated) during a photolithography process.

Figure 2:
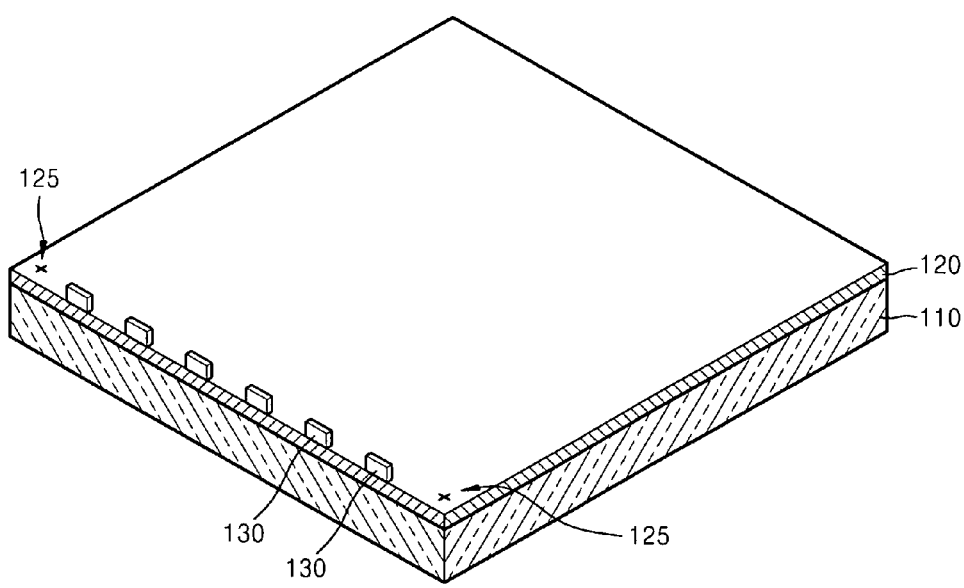
Figure 3A:
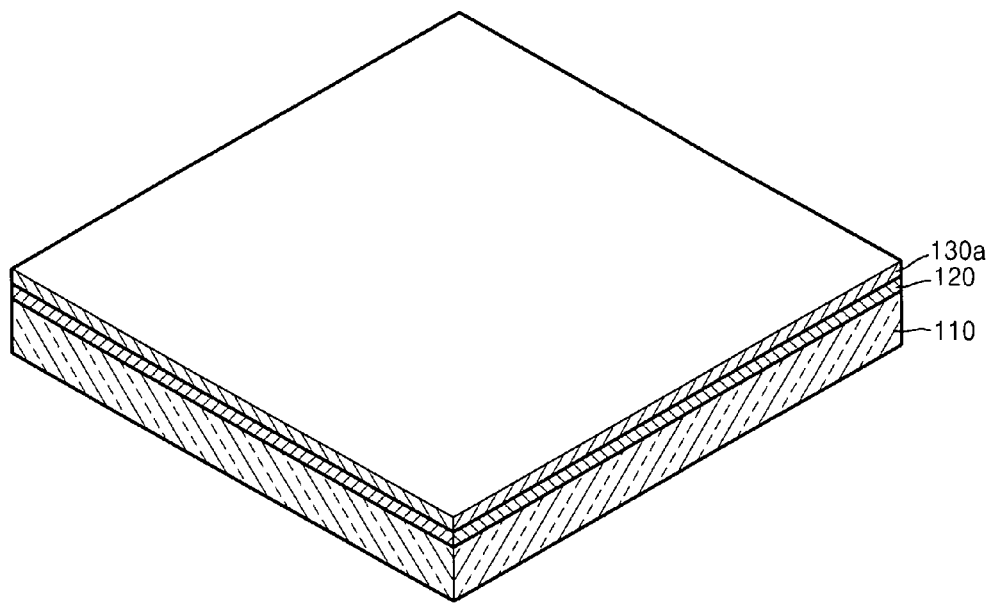
Figure 3B:
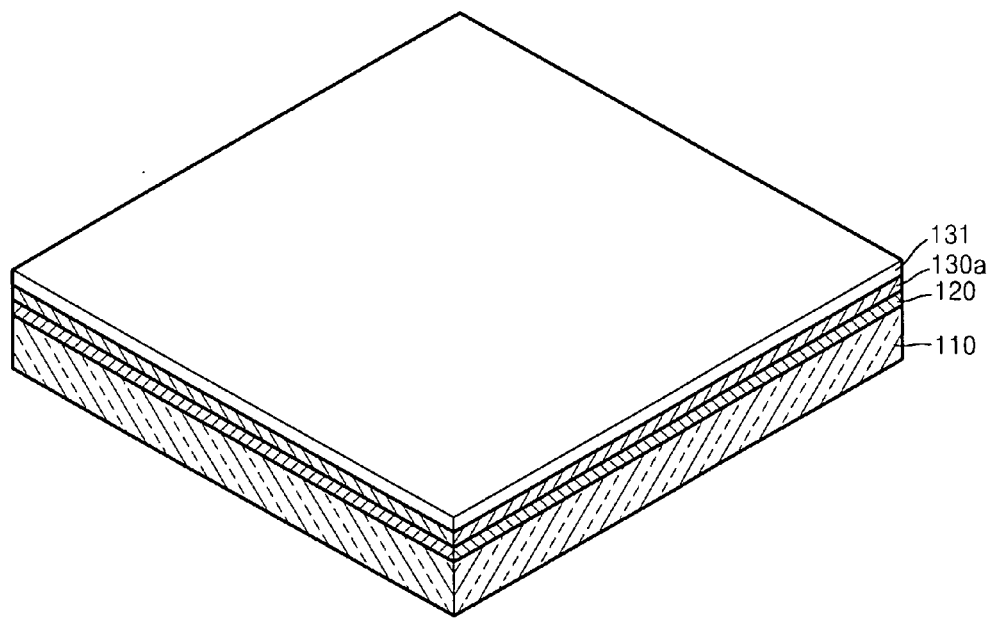
Figure 3C:
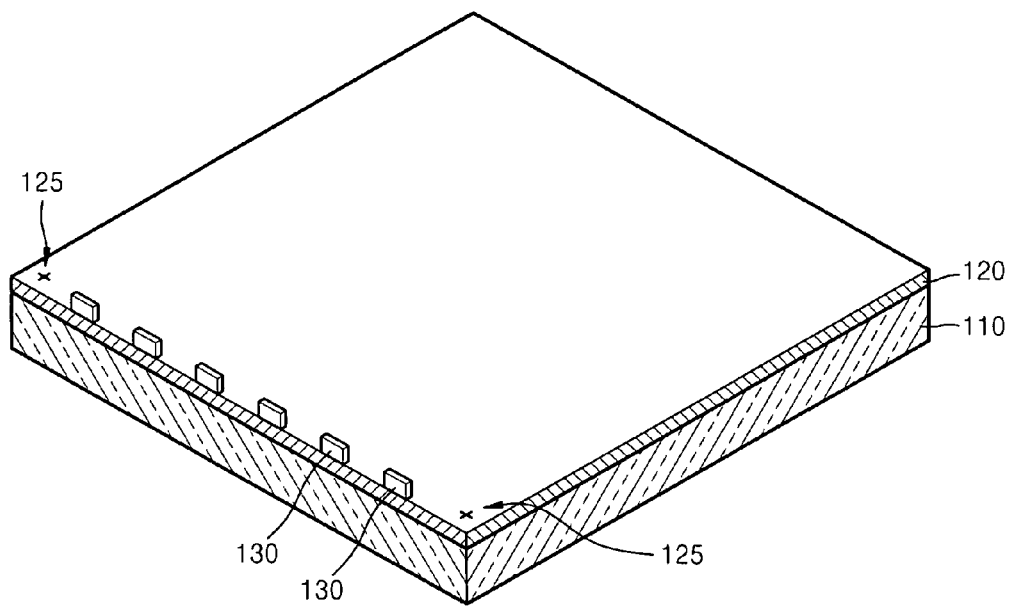

Referring to FIG. 2, the catalyst patterns 130 may be formed on the oxide layer 120. In example embodiments, the catalyst patterns 130 may be formed using a photolithography process. For example, as shown in FIGS. 3A-3C, a catalyst metal layer 130a may be formed on the oxide layer 120 as illustrated in FIG. 3A. The catalyst metal layer 130a may be formed of, for example, iron (Fe); however, example embodiments are not limited thereto. In FIG. 3B, a photoresist 131 may be coated to cover the catalyst metal layer 130a. A photo mask (not illustrated) may be disposed over the photoresist 131 and the photoresist 131 may be exposed and developed. The alignment markers 125 formed on the oxide layer 120 may be used to accurately expose and develop a desired position of the photoresist 131. When the developed photoresist 131 is used to etch the catalyst metal layer 120 and the photoresist 131 is removed, the catalyst patterns 130 may be formed on a desired position of the oxide layer 120 as illustrated in FIG. 3C. The photoresist may be removed using a photoresist stripper, for example, acetone.

Figure 4A:
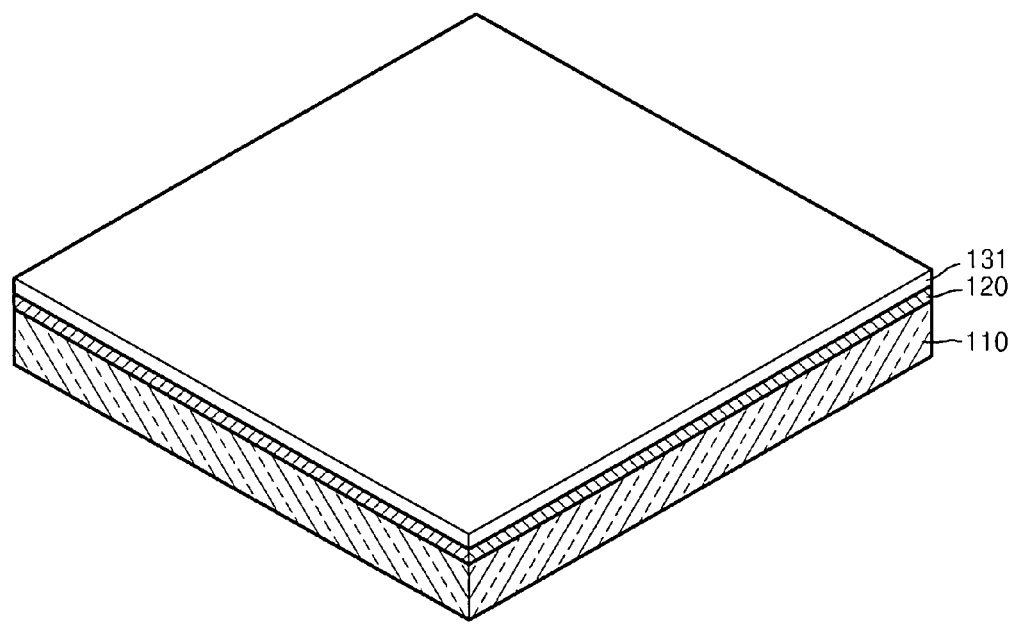
Figure 4B:
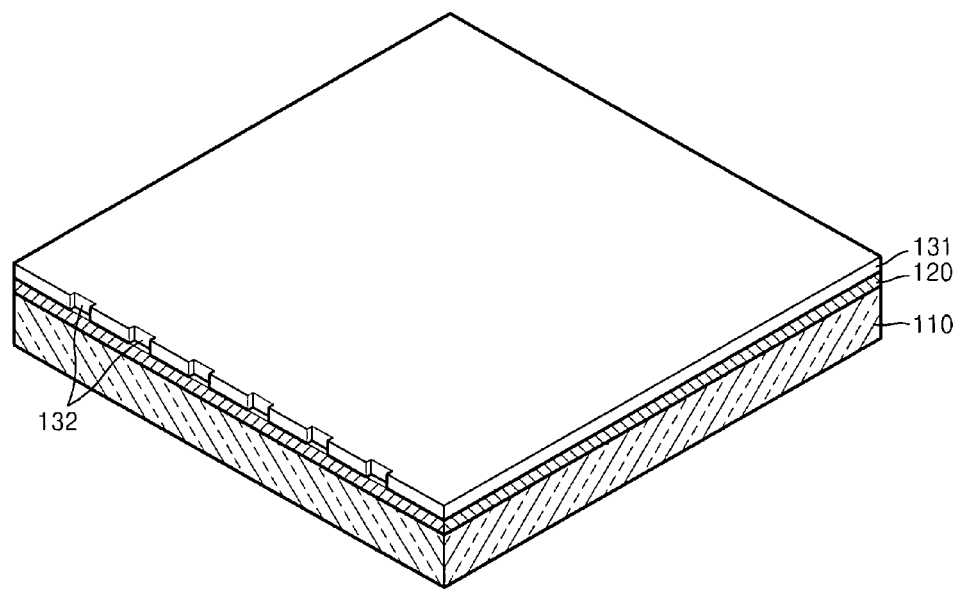
Figure 4C:
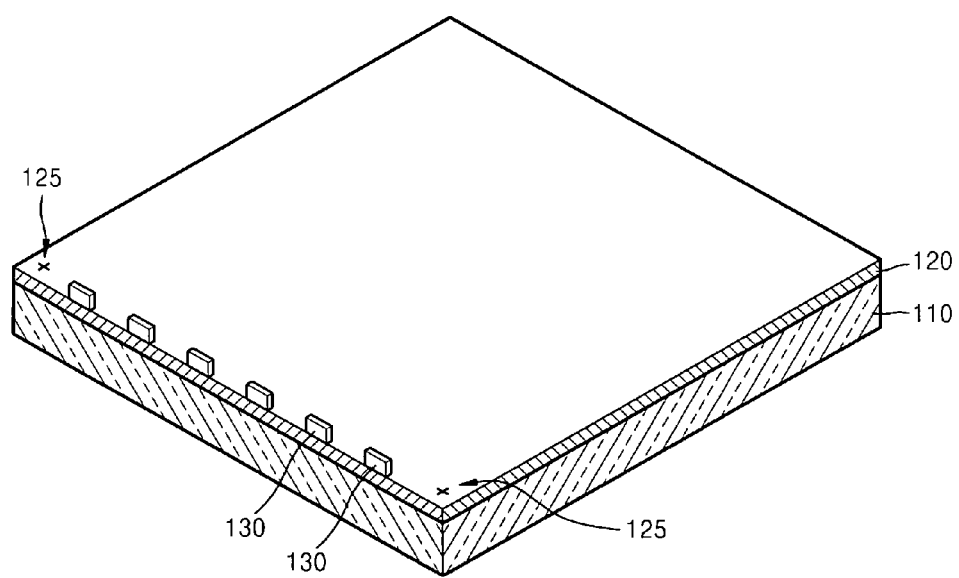

Alternatively, the catalyst patterns 130 may be formed as illustrated in FIGS. 4A-4C. In FIG. 4A, a photoresist 131 may be coated on the oxide layer 120, and in FIG. 4B, the coated photoresist 131 may be exposed and developed, thereby forming via holes 132 which expose the oxide layer 120 and have a shape similar to the catalyst patterns 130. The oxide layer 120, on which the photoresist is formed, may be immersed in and removed from a solution in which catalyst metal is dissolved, and the photoresist may be removed, thereby forming the catalyst patterns 130 on the oxide layer 120 as illustrated in FIG. 4C.

Figure 5A:
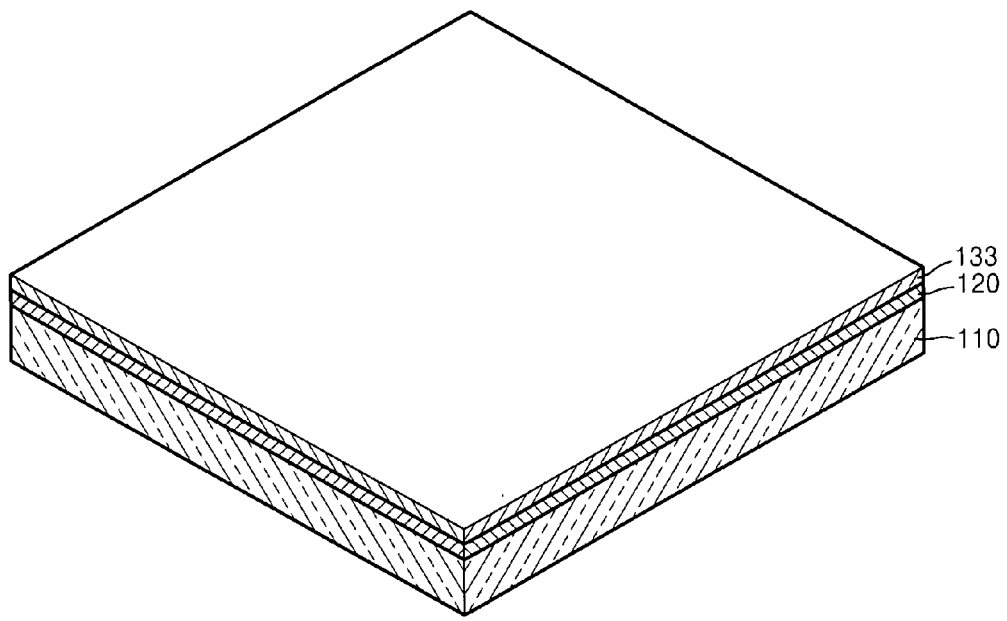
Figure 5B:
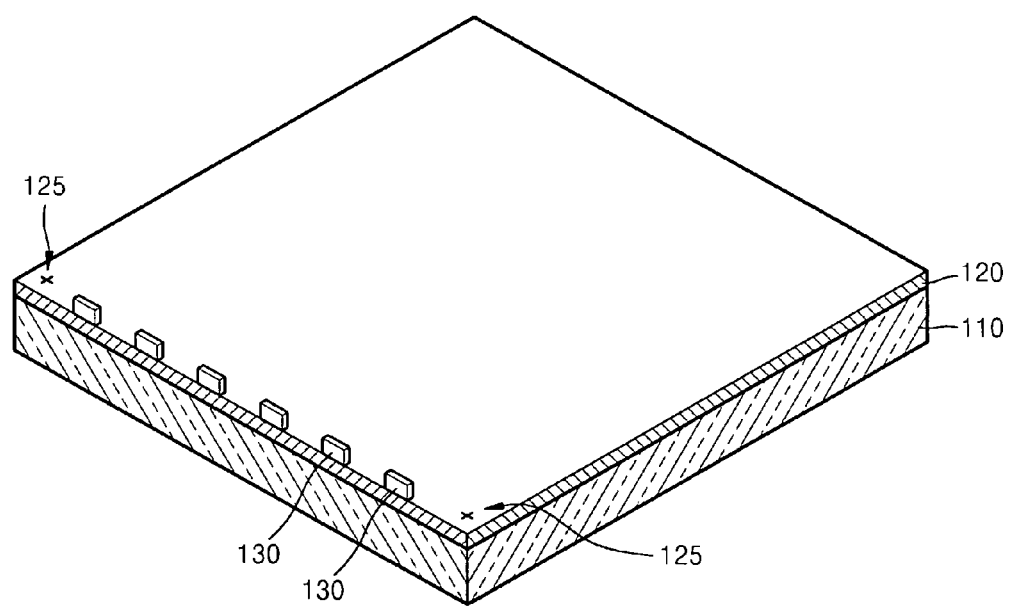

Alternatively, the catalyst patterns 130 may be formed as illustrated in FIGS. 5A-5B. In FIG. 5A, a mixture solution of a catalyst metal and a photoresist may be coated on the oxide layer 120 so as to form a catalyst resist layer 133, and the catalyst resist layer 133 may be exposed and developed. When the developed photoresist remaining on the oxide layer 120 is removed, the catalyst patterns 130 may be formed on the oxide layer 120 as illustrated in FIG. 5B.

Figure 6:
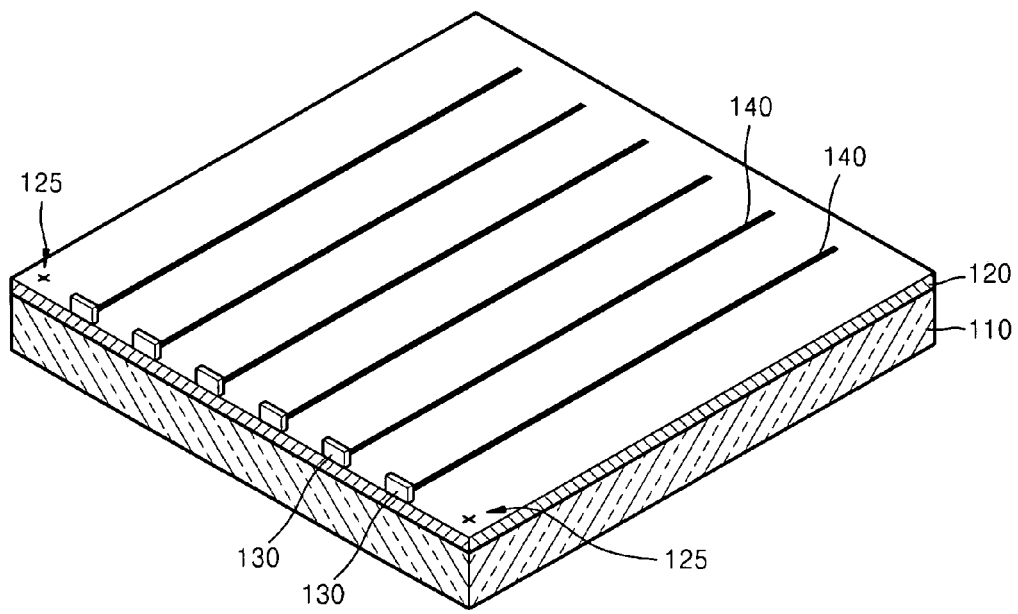

Referring to FIG. 6, CNTs 140 may be grown from the plurality of catalyst patterns 130. The CNTs 140 may be grown using chemical vapor deposition (CVD). For example, when reaction gas flows in a reaction chamber (not illustrated) and reacts with the catalyst patterns 130 formed on the oxide layer 120, the CNTs 140 may be formed from the catalyst patterns 130 on the oxide layer 120. The CNTs 140 may be grown in a direction parallel to a surface of the oxide layer 120. The CNTs 140 may be single-wall CNTs. Also, the CNTs 140 grown from the catalyst patterns 130 may be parallel to each other as illustrated in FIG. 6. In FIG. 6, a single CNT 140 may be grown from each catalyst pattern 130. However, two or more CNTs 140 may be grown from one catalyst pattern 130.

Figure 7:
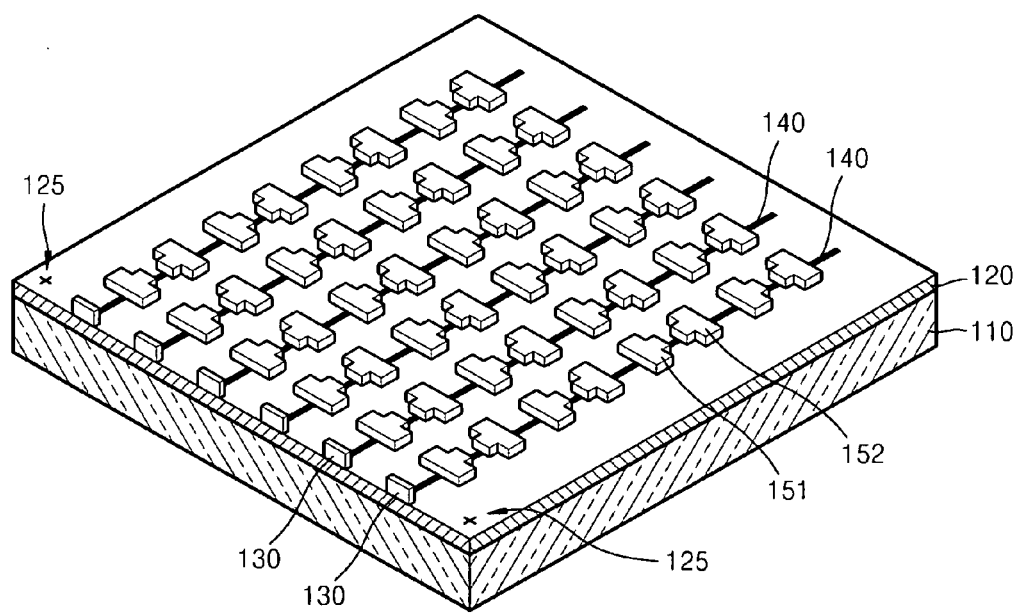
Figure 8A:
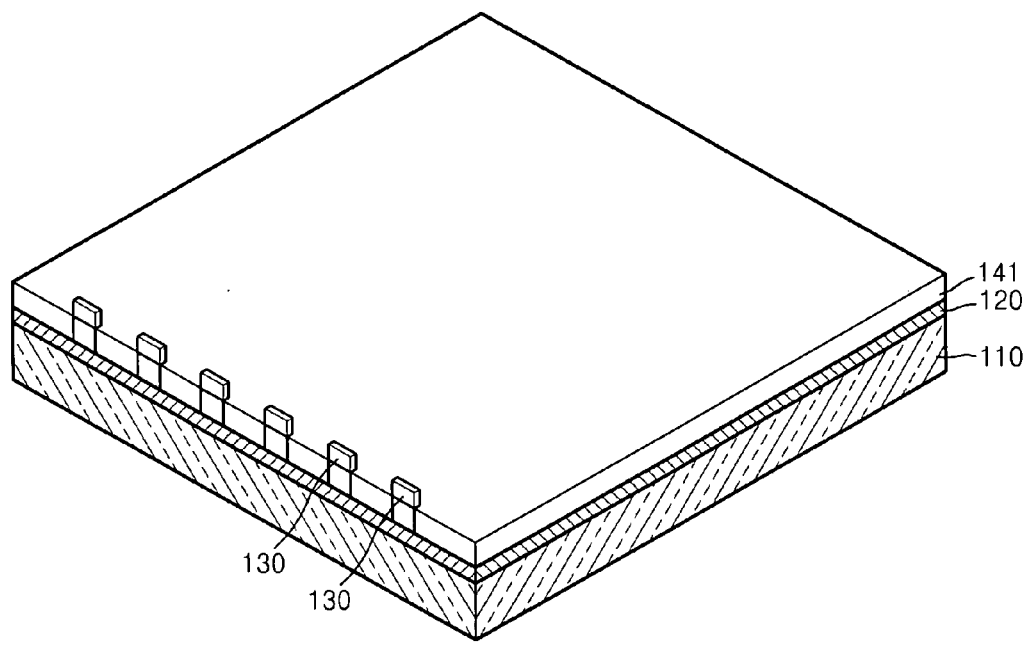
Figure 8B:
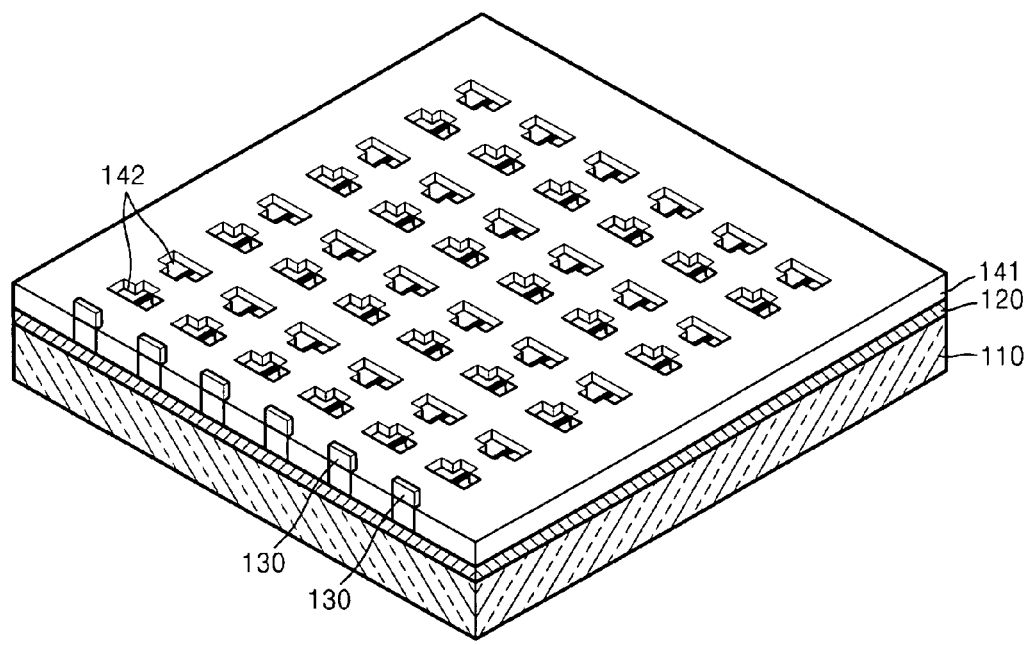
Figure 10:
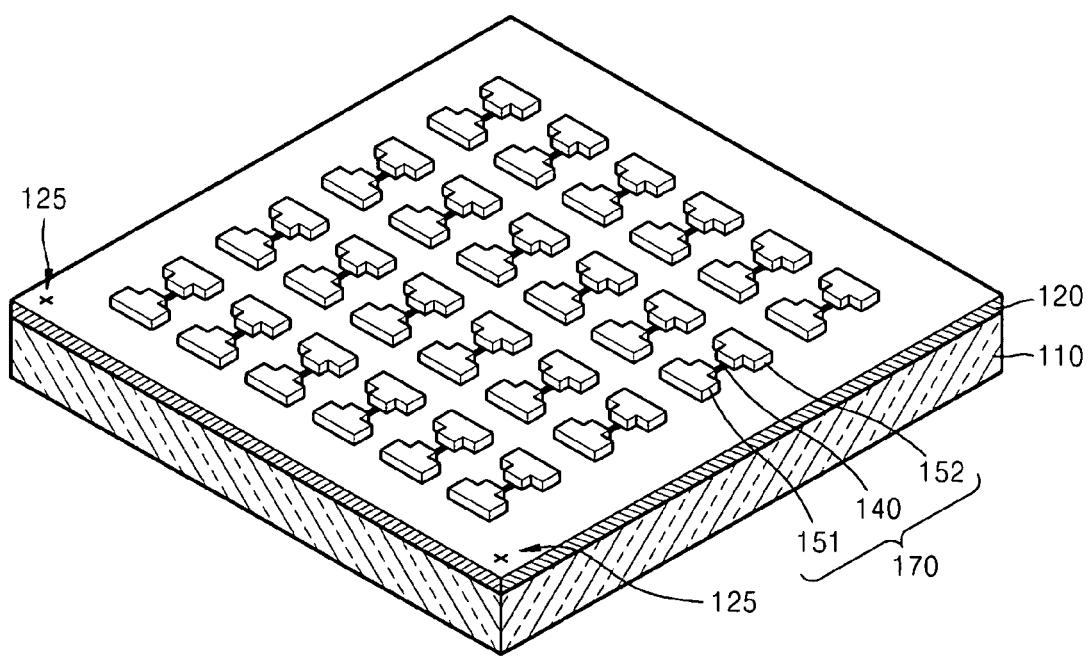

Referring to FIG. 7, the first and second electrodes 151 and 152 may be formed on the CNTs 140, thereby forming CNT device arrays. In example embodiments, the first and second electrodes 151 and 152 may be formed using a photolithography process as illustrated in FIGS. 8A-8B. For example, in FIG. 8A, a photoresist 141 may be coated on the oxide layer 120 so as to cover the CNTs 140. A photo mask (not illustrated) may be disposed over the photoresist 141 and the photoresist 141 may be exposed and developed. The alignment markers 125 formed on the oxide layer 120 may be used to accurately expose and develop a desired position of the photoresist 141. Accordingly, as illustrated in FIG. 8B, via holes 142, which expose the CNTs 140 and portions of the oxide layer 120 and are the shape of the first and second electrodes 151 and 152, may be formed in the developed photoresist 141. A metal layer (not illustrated) may be formed on the developed photoresist so as to fill the via holes. When the photoresist is removed using a photoresist stripper, the first and second electrodes 151 and 152 may be formed on desired positions of the CNTs 140. The metal layer formed on the photoresist may be removed together with the photoresist using a lift off method. Accordingly, CNT devices 170 as illustrated in FIG. 10 may be formed on the oxide layer 120. The CNT devices 170 may each include the first and second electrodes 151 and 152, spaced apart from each other, and the CNTs 140 connecting the first electrodes 152 to the second electrodes 152.

Figure 9:
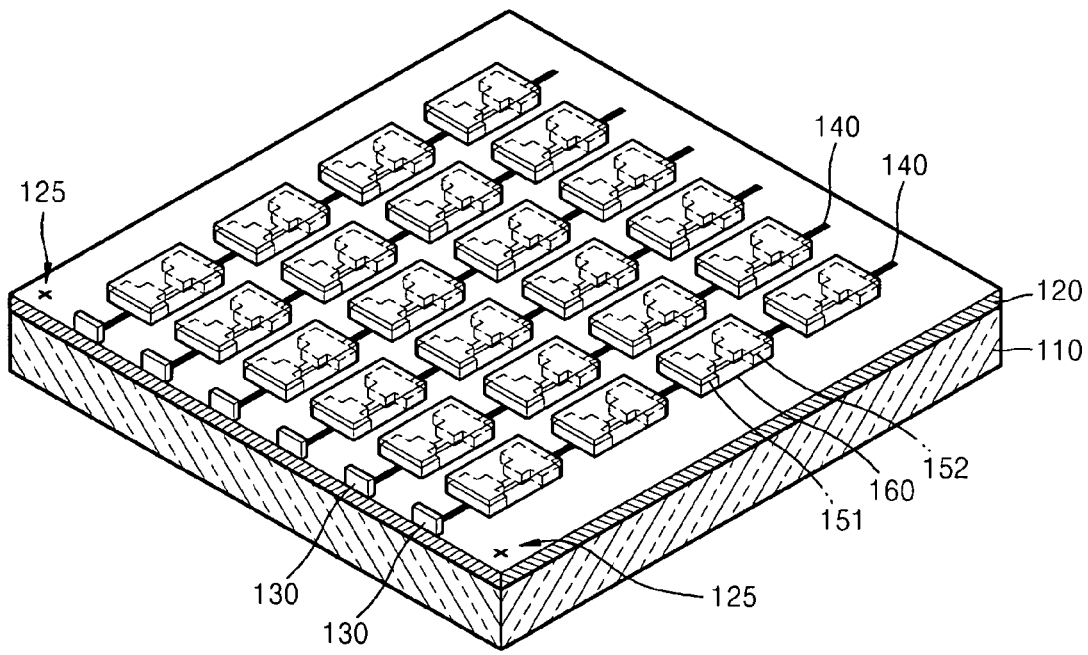

Referring to FIG. 9, protection films 160 corresponding to the CNT devices 170 of FIG. 10 may be formed on the oxide layer 120. The protection films 160 may be formed using a photolithography process. For example, a photoresist 141 may be coated on the oxide layer 120 (see FIG. 8A) so as to cover all the CNT devices 170 (see FIG. 10). A photo mask (not illustrated) may be disposed on the photoresist 141 and the photoresist 141 may be exposed and developed. Accordingly, the protection films 160 formed of the photoresist may be formed on the oxide layer 120 to cover the CNT devices 170.

Referring to FIG. 10, the portions of the CNTs 140, which are not part of the CNT devices 170 and remain on the oxide layer 120, may be removed. For example, as illustrated in FIG. 10, when plasma etching or ion milling is performed after the protection films 160 are formed, the CNTs 140 not included in the protection films 160, e.g., the CNTs 140 which are not part of the CNT devices 170 and remain around the CNT devices 170, may be removed. In addition, the catalyst patterns 130 remaining on the oxide layer 120 may be removed. When the protection films 160 are removed using a photoresist stripper, e.g., acetone, the manufacture of the CNT device arrays formed of the CNT devices 170, which are spaced apart from each other on the oxide layer 120, is complete as illustrated in FIG. 10. When the first electrodes 151, the second electrodes 152, and the CNTs 140 connecting the first electrodes 151 to the second electrodes 152 are used as source electrodes, drain electrodes, and channel material layers, respectively, the CNT devices 170 may constitute CNT transistors.

In example embodiments, one CNT device 170 may include two electrodes, for example, the first and second electrodes 151 and 152; however, example embodiments are not limited thereto. The CNT devices 170 may include one or more electrodes, and thus, electrical devices used for various purposes may be formed.

As described above, according to example embodiments, a photolithography process is used in the method of manufacturing the CNT device arrays so that CNTs may be formed on desired positions and the electrodes may be accurately formed on desired positions of the CNTs. Accordingly, CNT device arrays having a larger area may be more easily and economically manufactured. In addition, a plurality of electrodes may be formed on a single CNT so that a plurality of CNT devices having the same characteristics may be manufactured.

It should be understood that example embodiments described therein should be considered in a descriptive sense only and not for purposes of limitation. Descriptions of features or aspects within each embodiment should typically be considered as available for other similar features or aspects in other example embodiments.

What is claimed is:

1. A method of manufacturing carbon nanotube (CNT) device arrays, the method comprising:
   forming an oxide layer on a substrate;
   forming catalyst patterns on the oxide layer using a photolithography process;
   growing at least one CNT corresponding to each of the catalyst patterns on the oxide layer;
   forming at least one electrode on the at least one CNT corresponding to each of the catalyst patterns to form a plurality of CNT devices; and
   removing portions of the at least one CNT corresponding to each of the catalyst patterns that remains on the oxide layer and are not included in the plurality of CNT devices,
   wherein the at least one CNT corresponding to each of the catalyst patterns extends in a vertical direction parallel to the surface of the oxide layer and parallel to each other in a same direction.

2. The method of claim 1, wherein the substrate includes silicon and the oxide layer includes a silicon oxide.

3. The method of claim 1, wherein forming the oxide layer includes forming at least one alignment marker thereon.

4. The method of claim 1, wherein forming the catalyst patterns comprises:
   forming a catalyst metal layer on the oxide layer;
   forming a photoresist on the catalyst metal layer;
   exposing and developing the photoresist;
   etching the catalyst metal layer using the developed photoresist; and
   removing the photoresist.

5. The method of claim 1, wherein forming the catalyst patterns comprises:
   coating a photoresist on the oxide layer;
   exposing and developing the photoresist in order to form via holes that expose the oxide layer and have the same shape as the catalyst patterns;
   immersing a portion of the oxide layer where the developed photoresist is formed in a solution and removing the oxide layer from the solution, the solution dissolving a catalyst metal; and
   removing the photoresist.

6. The method of claim 1, wherein forming the catalyst patterns comprises:
   coating a solution mixture of a catalyst metal and a photoresist on the oxide layer in order to form a catalyst resist layer on the oxide layer;
   exposing and developing the catalyst resist layer; and
   removing the photoresist.

7. The method of claim 1, wherein growing the at least one CNT includes using chemical vapor deposition (CVD).

8. The method of claim 7, wherein the at least one CNT corresponding to each of the catalyst patterns includes at least one single-wall CNT.

9. The method of claim 1, wherein forming the at least one electrode includes forming a first electrode and a second electrode, spaced apart from each other, the at least one CNT corresponding to each of the catalyst patterns connecting the first electrode to the second electrode.

10. The method of claim 9, wherein the first electrode, the second electrode, and the at least one CNT connecting the first electrode to the second electrode are a source electrode, a drain electrode, and a channel material layer, respectively, and the plurality of CNT devices constitute a plurality of CNT transistors.

11. The method of claim 1, wherein the forming the at least one electrode includes using a photolithography process.

12. The method of claim 11, wherein forming the at least one electrode comprises:
    forming a photoresist on the oxide layer to cover the at least one CNT corresponding to each of the catalyst patterns;
    exposing and developing the photoresist in order to form via holes that expose the oxide layer and the at least one CNT and have the same shape as the at least one electrode;
    forming a metal layer on the developed photoresist so as to fill the via holes; and
    removing the photoresist.

13. The method of claim 1, wherein removing the portions of the at least one CNT corresponding to each of the catalyst patterns comprises:
    forming a photoresist on the oxide layer to cover the plurality of CNT devices;
    exposing and developing the photoresist;
    using the developed photoresist as a protection film and removing the portions of the at least one CNT remaining around the plurality of CNT devices; and
    removing the photoresist.

14. The method of claim 13, wherein removing the photoresist includes using a photoresist stripper.

15. The method of claim 14, wherein the photoresist stripper is acetone.

16. The method of claim 13, wherein removing the portions of the at least one CNT remaining around the plurality of CNT devices includes using plasma etching or ion milling.

* * * * *